(12) United States Patent
Lim et al.

(10) Patent No.: US 8,970,617 B2
(45) Date of Patent: Mar. 3, 2015

(54) 3-DIMENSIONAL DISPLAY DEVICE AND DATA PROCESSING METHOD THEREOF

(75) Inventors: KyoungHo Lim, Yongin-si (KR); Jung-taek Kim, Daejeon (KR); Joo-Young Kim, Suwon-si (KR); CheolWoo Park, Suwon-si (KR); Mun-San Park, Hwaseong-si (KR); KyoungWon Lee, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 509 days.

(21) Appl. No.: 13/275,875

(22) Filed: Oct. 18, 2011

(65) Prior Publication Data
US 2012/0274628 A1 Nov. 1, 2012

(30) Foreign Application Priority Data
Apr. 29, 2011 (KR) .................. 10-2011-0041109

(51) Int. Cl.
| | | |
|---|---|---|
| G09G 5/02 | (2006.01) | |
| G06T 15/00 | (2011.01) | |
| G02B 27/22 | (2006.01) | |
| G02B 27/26 | (2006.01) | |
| H04N 13/00 | (2006.01) | |
| G09G 3/00 | (2006.01) | |
| H04N 13/04 | (2006.01) | |

(52) U.S. Cl.
CPC .............. *G06T 15/00* (2013.01); *G02B 27/22* (2013.01); *G02B 27/26* (2013.01); *H04N 13/00* (2013.01); *G09G 3/00* (2013.01); *H04N 13/0048* (2013.01); *H04N 13/0452* (2013.01); *H04N 13/0497* (2013.01)
USPC ........... 345/596; 345/597; 345/598; 345/600; 345/605; 345/690; 345/694; 345/7; 345/9; 348/43; 348/51

(58) Field of Classification Search
None
See application file for complete search history.

(56) References Cited

U.S. PATENT DOCUMENTS

| | | | | |
|---|---|---|---|---|
| 6,028,587 | A * | 2/2000 | Igari | 345/597 |
| 7,518,622 | B2 * | 4/2009 | Ochi | 345/690 |
| 7,808,510 | B2 * | 10/2010 | Miyasaka | 345/600 |
| 2001/0015753 | A1 * | 8/2001 | Myers | 348/51 |
| 2012/0154428 | A1 * | 6/2012 | Barnhoefer | 345/596 |

FOREIGN PATENT DOCUMENTS

| | | |
|---|---|---|
| JP | 2009-080144 | 4/2009 |
| KR | 10-2005-0107684 | 11/2006 |
| KR | 10-2009-0058822 | 6/2009 |

* cited by examiner

*Primary Examiner* — Antonio A Caschera
(74) *Attorney, Agent, or Firm* — H.C. Park & Associates, PLC

(57) ABSTRACT

The display device includes a timing controller, a data driving unit, a gate driving unit, and a display panel. The timing controller divides m-bit image data (m is a natural number) received from the outside into n different image data for each viewpoint (n is 2 or larger natural number), and generates an output frame composed of a plurality of 3-dimensional image data including the n image data for each viewpoint. Then, the output frame is dithered so that the image data for each viewpoint expresses m-bit gradation with l bit, and image data for each viewpoint included in the output frame are outputted as output image signals.

11 Claims, 16 Drawing Sheets

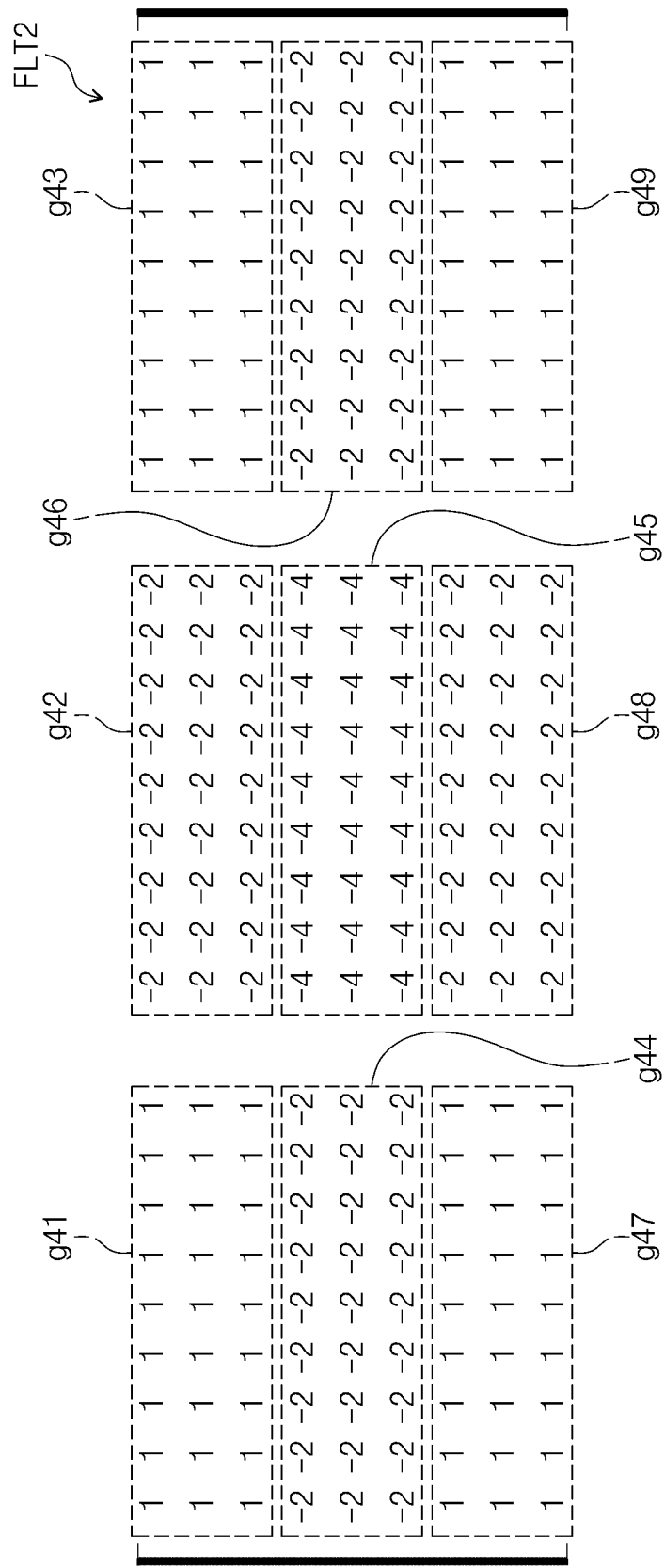

Fig. 15A

3-DIMENSIONAL DISPLAY DEVICE AND DATA PROCESSING METHOD THEREOF

CROSS-REFERENCE TO RELATED APPLICATIONS

This application claims priority from and the benefit of Korean Patent Application No. 10-2011-0041109, filed on Apr. 29, 2011, which is hereby incorporated by reference for all purposes as if fully set forth herein.

BACKGROUND

1. Field of the Invention

Exemplary embodiments of the present invention relate to an apparatus and method for processing data associated with a 3-dimensional display device (3-D), and more particularly, to a 3-D device capable of providing an enhanced display quality.

2. Description of the Background

A 3-D display device has been classified into a stereoscopic 3-dimensional display device for providing 3-D images by presenting two offset images separately to the left and right eye of a viewer, and an autostereoscopic 3-D display device for displaying stereoscopic images without the use of special headgear or glasses on the part of the viewer.

The autostereoscopic 3-D display device displays images with different viewing angles when the viewer's head is in a certain position, a different images is seen with each eye, giving a convincing illusion of 3D.

Regardless of the above 3-D display device types, multiple pixels for displaying different images correspond to one pixel of 3-D image to display a 3-D images. Therefore, when a method and apparatus for displaying 2-D images is applied to display 3-D images, distortion of an image or gradation banding phenomenon may be inevitable.

Therefore, there is a need for an approach to improve data processing associated with displaying 3-D images.

SUMMARY

These and other needs are addressed by the present invention, in which exemplary embodiments provide a method for processing data associated with 3-D display and a 3-D image display device capable of improving display quality.

Additional features of the invention will be set forth in the description which follows, and in part will be apparent from the description, or may be learned by practice of the invention.

Exemplary embodiments of the present invention disclose a display device. The device includes a frame generating unit configured to receive an input frame comprising m-bit image data, wherein m is a natural number, to divide the image data into n different image data for each viewpoint, wherein n is a natural number greater than or equal to 2, and to generate an output frame comprising a plurality of 3-dimensional image data comprising the n different image data for each viewpoint. The device also includes a gradation converting unit configured to perform a dithering operation to the output frame using a dither matrix comprising a plurality of (m-l)-bit critical values which are divided into k groups, wherein k is a natural number greater than or equal to 4 or larger natural number, and the division is performed by one-to-one correspondence with k numbers of the 3-dimensional image data so that each of the image data for each viewpoint expresses m-bit gradation with l bits, and to output the dithered image data for each viewpoint as output image signals. The device also includes a data driving unit configured to generate a data driving voltage signal based on the output image signals received from the gradation converting unit. And the device includes a display panel configured to display an image in response to receiving the data driving voltage signal from the data driving unit.

Exemplary embodiments of the present invention disclose a display device. The device includes a frame generating unit configured to receive an input frame comprising a plurality of image data, to divide the image data into n different image data for each viewpoint, wherein n is a natural number greater than or equal to 2, and to generate an output frame composed of a plurality of 3-dimensional image data comprising the n image data for each viewpoint. The device also includes a filter processing unit configured to match a reference group of a filter comprising a plurality of elements which are classified into k groups, wherein k is a natural number greater than or equal to 4 corresponding to k 3-dimensional image data to each of the 3-dimensional image data, to convert each of the image data for each viewpoint comprising each of the 3-dimensional image data using image data of the same viewpoint included in neighboring 3-dimensional image data and elements of a filter corresponding thereto, and to output the converted n image data for each viewpoint as output image signals. The device includes a data driving unit configured to generate a data driving voltage signal based on the output image signals received from the filter processing unit. The device includes a display panel configured to display an image in response to receiving the data driving voltage signal from the data driving unit.

Exemplary embodiments of the present invention disclose a method for processing data provided to a display panel which comprises a plurality of pixels for displaying an image. The method includes receiving an input frame comprising m-bit image data, wherein m is a natural number from the outside, dividing the image data into n different image data for each viewpoint, wherein n is a natural number greater than or equal to 2, and generating an output frame comprising a plurality of 3-dimensional image data comprising the n different image data for each viewpoint. The method also comprising dithering the output frame using a dither matrix comprising a plurality of (m-l)-bit critical values which are divided into k groups, wherein k is a natural number greater than or equal to 4, and the division is performed by one-to-one correspondence with k numbers of the 3-dimensional image data so that each of the image data for each viewpoint expresses m-bit gradation with l bits, and outputting the dithered image data for each viewpoint as output image signals.

Exemplary embodiments of the present invention disclose a method. The method receiving an input frame comprising a plurality of image data, dividing the image data into n different image data for each viewpoint, wherein n is 2 or larger natural number, generating an output frame composed of a plurality of 3-dimensional image data comprising the n image data for each viewpoint. The method also includes matching a reference group of a filter comprising a plurality of elements which are classified into k groups, wherein k is 4 or larger natural number, which corresponding to k 3-dimensional image data to each of the 3-dimensional image data, converting each of the image data for each viewpoint composing each of the 3-dimensional image data using image data of the same viewpoint included in neighboring 3-dimensional image data and elements of a filter corresponding thereto, and outputting the converted n image data for each viewpoint as output image signals.

Exemplary embodiments of the present invention disclose a display. The display includes a processor configured to a processor configured to divide m-bit image data, wherein the m is natural number into n different image data with respect to each view point, wherein the n is 2 or larger natural number, and to generate an output frame comprising a plurality of 3-dimensional image data comprising the n image data for each viewpoint, and to dither the output frame to express the image data for each viewpoint as m-bit gradation with l-bits, wherein image data for each viewpoint in the output frame is outputted as output image signals.

Exemplary embodiments of the present invention disclose a method. The method includes dividing m-bit image data, wherein the m is natural number, into n different image data with respect to each view point, wherein the n is 2 or larger natural number, and to generate an output frame comprising a plurality of 3-dimensional image data comprising the n image data for each viewpoint. The method also includes dithering the output frame to express the image data for each viewpoint as m-bit gradation with l-bits. The method includes outputting image data for each viewpoint in the output frame as output image signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 14 is a diagram illustrating an exemplary filter according to exemplary embodiments of the present invention.

FIG. 15A and FIG. 15B are diagrams illustrating a filtering process according to exemplary embodiments of the present invention.

DETAILED DESCRIPTION OF THE EMBODIMENTS

Exemplary embodiments of the present invention will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Figure 1:
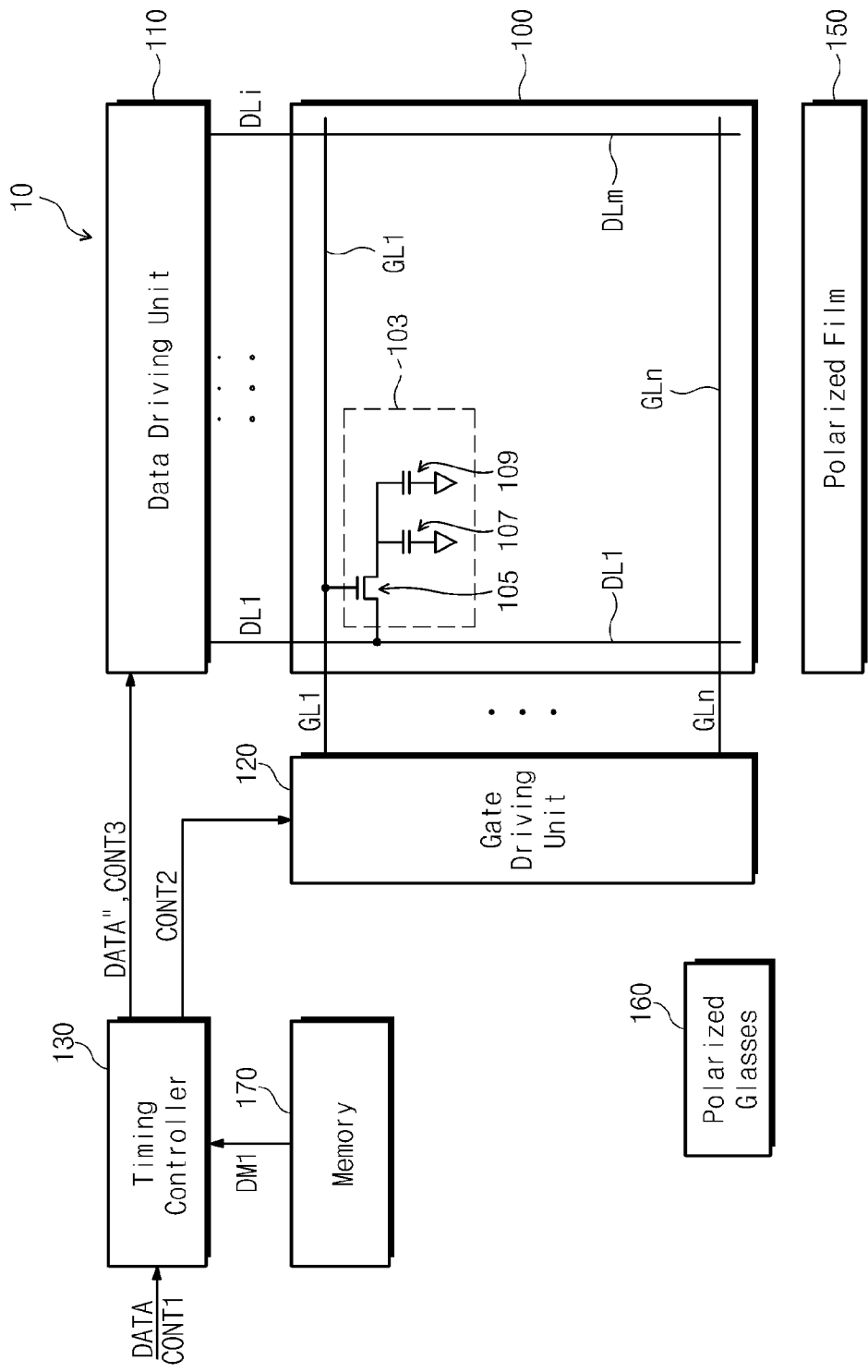
FIG. 1 is a block diagram illustrating a display device according to exemplary embodiments of the present invention.

FIG. 1 is a block diagram illustrating a display device according to exemplary embodiments of the present invention.

Referring to FIG. 1, for example, a display device 10 includes a display panel 100 for displaying an image, a data driving unit 110 and a gate driving unit 120 for driving the display panel 100, and a timing controller 130 for controlling the data driving unit 110 and the gate driving unit 120.

For example, the timing controller 130 receives an input frame including m-bit image data DATA (m is a natural number) from a video system (not illustrated), separates m-bit first image data for right eye and m-bit second image data for left eye from the image data DATA included in the input frame, and rearranges the m-bit first image data and the m-bit second image data to generate an output frame. The timing controller 130 converts the m-bit first image data and the m-bit second image data included in the output frame into an l-bit signal (l is a natural number smaller than m), and outputs the converted m-bit first image data and m-bit second image data as output image signals DATA". Also, the timing controller 130 receives a control signal CONT1 from the outside, and generates a gate control signal CONT2 for controlling the gate driving unit 120 and a data control signal CONT3 for controlling the data driving unit 110 using the received control signal CONT1. The generated gate control signal CONT2 and data control signal CONT3 are respectively provided to the gate driving unit 120 and the data driving unit 110.

The data driving unit 110 receives the output image signals DATA" from the timing controller 130, and converts the output image signals DATA" into data voltages to provide the data voltages to the display panel in response to the data control signal CONT3. As described above, the output image signals DATA" include the first image data and the second image data, and the data voltages include first data voltages and second data voltages corresponding to the first image data and the second image data respectively. The data driving unit 110 is electrically connected to data lines DL1 to DLi provided to the display panel 100, and alternately provides the first data voltage and the second data voltage to rows of the data lines DL1 to DLi.

The gate driving unit 120 is connected to gate lines GL1 to GLh provided to the display panel 100, and provides gate voltages to the gate lines GL1 to GLh. For example, the gate driving unit 120 generates gate signals including a gate on voltage VON and a gate off voltage VOFF for driving the gate lines GL1 to GLh based on the gate control signal CONT2 outputted from the timing controller 130. And, the gate driving unit 120 sequentially outputs the generated gate signals to the gate lines GL1 to GLh. The gate control signal CONT2 may include a vertical initiating signal STV for initiating an operation of the gate driving unit 120, a gate clock signal GCLK for determining output time of the gate signals, and an output enable signal OE for determining an on-pulse width of the gate on voltage.

The display panel 100 receives the data voltages from the data driving unit 110, receives the gate signals from the gate driving unit 120, and displays an image in response to the gate signals.

For example, the display panel 100 is provided with a plurality of gate lines GL1 to GLh for receiving the gate signals and a plurality of data lines DL1 to DLi for receiving the data voltages. The display panel 100 includes a plurality of pixels 103, and each pixel 103 includes a thin film transistor 105 and a liquid crystal capacitor 107. In this example, the pixel 103 may further include a storage capacitor 109. As an example, the pixel 103 may include at least a first pixel, a second pixel and a third pixel for displaying three different colors. For instance, the first pixel, the second pixel and the third pixel may express red, green, and blue respectively. The display panel 100 may express one color data using a pixel constituted of the first pixel, the second pixel and the third pixel (hereinafter, 2D pixel) in a 2D driving mode.

According to exemplary configurations, a plurality of pixels 103 may have the same structure. In this example, therefore, one of the pixels is described, and descriptions for others are omitted to avoid unnecessarily obscuring the present invention.

For example, the thin film transistor 105 of the pixel 103 is provided with a gate electrode connected to a first gate line GL1 among the gate lines GL1 to GLn, a data electrode connected to a first data line DL1 among the data lines DL1 to DLh, and a drain electrode connected to the liquid crystal capacitor 107 and the storage capacitor 109. The liquid crystal capacitor 107 and the storage capacitor 109 are connected in parallel to the drain electrode.

The liquid crystal capacitor 107 may include a pixel electrode, a common electrode facing the pixel electrode, and a liquid crystal layer between the pixel electrode and the common electrode. In this example, the drain electrode is connected to the pixel electrode of the liquid crystal capacitor 107. Therefore, the pixel electrode may receive a data voltage outputted from the thin film transistor 105. Meanwhile, the common electrode may receive a reference voltage. Therefore, the liquid crystal capacitor 107 is charged with a voltage corresponding to a potential difference between the data voltage and the reference voltage.

Although not illustrated in the drawings, the display panel 100 may include a first display substrate (not illustrated), a second display substrate (not illustrated) facing the first display substrate, and a liquid crystal layer (not illustrated) between the first and second display substrates, by way of exemplary configurations.

For example, the pixel electrode may be provided onto the first display substrate, and the common electrode may be provided onto the second display substrate so that the pixel electrode and the common electrode may face each other about the liquid crystal layer. However, for example, the pixel electrode and the common electrode may be provided onto one of the first display substrate and the second display substrate. The display panel 100 receives the first data voltage and the second data voltage, and displays an image composed of an image for left eye and an image for right eye. For instance, the display panel 100 may display an image for right eye on odd-numbered pixel rows which receive the first data voltages, and may display an image for left eye on even-numbered pixel rows which receive the second data voltages. The display device 100 further includes a polarized film 150 for dividing an image of the display panel 100 into an image for left eye and an image for right eye, and polarized glasses 160 for observing the divided images for left eye and right eye.

For example, the polarized film 150 is provided on the display panel 100, and includes a first polarized part having a first polarized direction and a second polarized part having a second polarized direction different from the first polarized direction. For instance, the first polarized part may be provided to the odd-numbered pixel rows, and the second polarized part may be provided to the even-numbered pixel rows.

Corresponding to this configuration, for example, the polarized glasses 160 includes a first polarized lens provided to a right side (not illustrated) and having the first polarized direction, and a second polarized lens provided to a left side (not illustrated) and having the second polarized direction. When a user wears the polarized glasses 160, an image for right eye displayed on odd-numbered pixel rows is received by the first polarized lens of the polarized glasses 160, and an image for left eye displayed on even-numbered pixel rows is received by the second polarized lens so that a user may recognize a 3-dimensional image.

Also, the display device 10 may further include a memory 170 for storing a dither matrix DM1 used for a gradation conversion.

Figure 2:
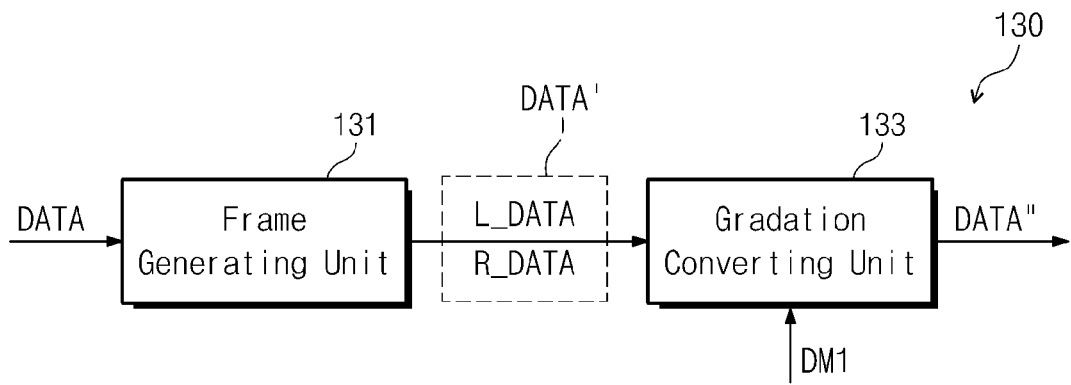
FIG. 2 is a block diagram illustrating a timing controller of FIG. 1.

FIG. 2 is a block diagram illustrating the timing controller 130 of FIG. 1.

Referring to FIG. 2, for example, the timing controller 130 includes a frame generating unit 131 and a gradation converting unit 133.

The frame generating unit 131 receives the input frame including the m-bit image data DATA from the video system (not illustrated), and divide the received image date DATA into the first image data R_DATA and the second image L_DATA. The frame generating unit 131 rearranges the first image data R_DATA and the second image L_DATA to generate an output frame. For example, the frame generating unit 131 may rearrange the first image data R_DATA and the second image L_DATA so that the first image data R_DATA are applied to the odd-numbered pixel rows of the display panel 100 and the second image data L_DATA are applied to the even-numbered pixel rows of the display panel 100.

When the number of bits processible by the data driving unit 110 (hereinafter, l bits, wherein l is a natural number smaller than m) is smaller than the number of bits representing the first image data and the second image data (hereinafter, m bits), the gradation converting unit 133 converts the m-bit first image data R_DATA and the m-bit second image data L_DATA into l-bit first image data and l-bit second image data. The converted first image data R_DATA and second image data L_DATA are supplied to the data driving unit 110 as the output image signals DATA".

However, since all gradations expressible with m bits are not expressible with l bits, the gradation converting unit 133 performs a dithering operation to the output frame to express m-bit gradation with l bits. The dithering operation means that gradation of each region in the output frame is expressed as sum of different gradations of pixels in a region. The dithering operation is performed using a dither matrix constituted of a combination of different critical values. Herein, the critical values include values expressible with (m-l) bits.

However, since all gradations expressible with m bits are not expressible with l bits, the gradation converting unit 133 performs a dithering operation to the output frame to express m-bit gradation with l bits. The dithering operation means that gradation of each region in the output frame is expressed as sum of different gradations of pixels in a region. The dithering operation is performed using a dither matrix constituted of a combination of different critical values. Herein, the critical values include values expressible with (m-l) bits.

However, unlike 2-dimensional image of which one frame image is directly observed by a user, one frame image of a 3-dimensional image is divided into an image for left eye and an image for right eye to be observed by a user. Therefore, when the output frame is dithered, the image for left image and the image for right image are individually dithered.

In this example, the dither matrix DM1 is configured based on 3-dimensional image data DATA' defined by a pair of the first image data R_DATA and the second image data L_DATA.

Hereinafter, a dither matrix used for exemplary embodiments of the present invention, and a gradation converting method of the gradation converting unit 133 using the dither matrix will be described in detail.

Figure 3A:
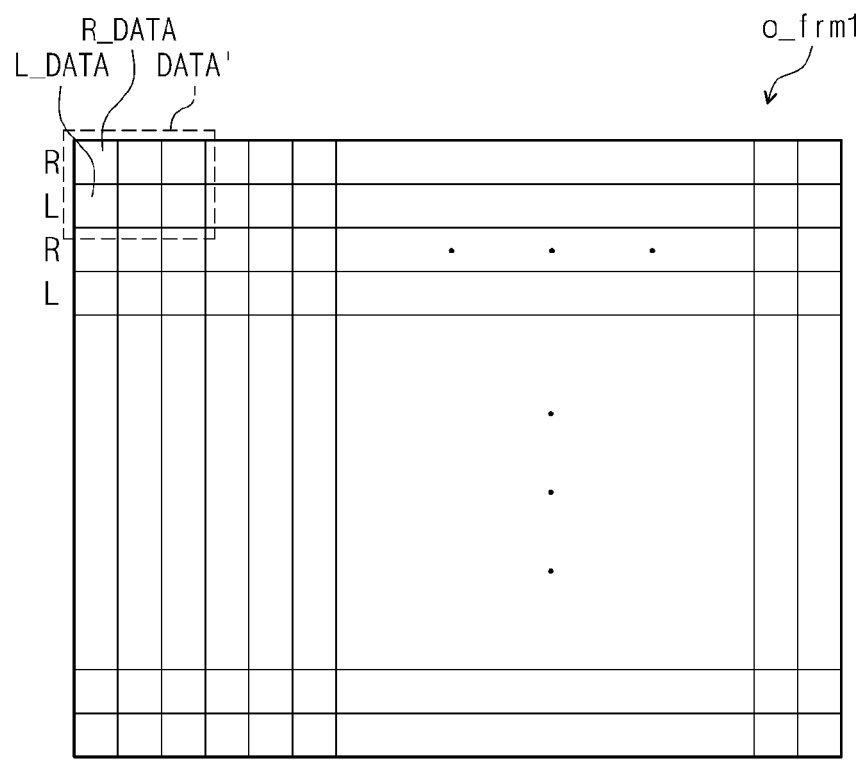
FIG. 3A is a diagram illustrating an output frame according to exemplary embodiments of the present invention.
Figure 3B:
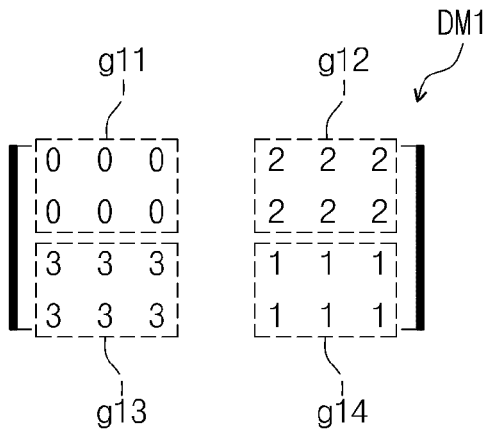
FIG. 3B is a diagram illustrating an exemplary dither matrix applied to an output frame of FIG. 3A.

FIG. 3A is a diagram illustrating an output frame according to exemplary embodiments of the present invention, and FIG. 3B is a diagram illustrating an exemplary dither matrix.

Referring to FIG. 3A, in the output frame o_frm1, each 3-dimensional image data DATA' includes three first image data R_DATA for right eye and three second image data L_DATA for left eye. The three first image data R_DATA for right eye may include a first red image data, a first green image data, and a first blue image data. For example, the three second image data L_DATA may include a second red image data, a second green image data, and a second blue image data.

FIG. 3B illustrates a dither matrix DM1 which is applied to the output frame o_frm1 of FIG. 3A, and corresponds to four 3-dimensional image data DATA' arranged in a 2×2 matrix form. For example, the dither matrix DM1 four critical values, i.e., 0, 1, 2, and 3.

Referring to FIG. 3B, the dither matrix DM1 may be divided into four groups g11 to g14 corresponding to the four 3-dimensional image data DATA' respectively. Also, for comparing the first image data R_DATA and the second image data L_DATA included in the same 3-dimensional image data DATA' with the same critical value, critical values in the same group are the same. The dither matrix DM1 may be preconfigured and stored in the memory 170.

Figure 4:
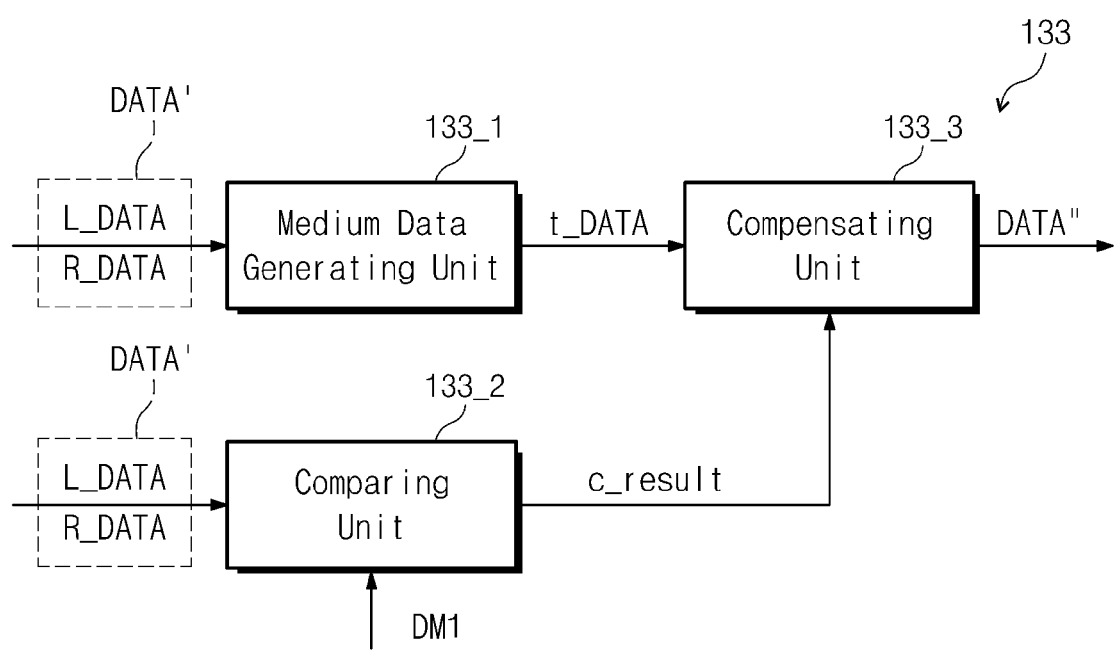
FIG. 4 is a block diagram illustrating a gradation converting unit illustrated in FIG. 2.

FIG. 4 is a block diagram illustrating the gradation converting unit 133 illustrated in FIG. 2.

Referring to FIG. 4, for example, the gradation converting unit 133 includes a medium data generating unit 133_1, a comparing unit 133_2, and a compensating unit 133_3.

The medium data generating unit 133_1 respectively selects l-upper bits from m bits of the first and second image data R_DATA and L_DATA included in the output frame o_frm1 received from the frame generating unit 131, and converts the selected bits into medium image data t_DATA.

The comparing unit 133_2 divides the output frame o_frm1 into a plurality of regions having the same size as the dither matrix DM1. For example, when the dither matrix DM1 is configured as a 2×2 matrix corresponding to four 3-dimensional data DATA' as illustrated in FIG. 3B, each of the regions may be configured as 2×2 matrix.

And, the comparing unit 133_2 matches each of the regions to the dither matrix DM1. Accordingly, the first image data R_DATA and the second image data L_DATA included in each of the regions one-to-one correspond to critical values in the dither matrix DM1. Then, the comparing unit 133_2 compares respective values of lower (m-l) bits of the first image data R_DATA and the second image data L_DATA with a corresponding critical value, and outputs each comparison result as flag c_result. For example, when a value of lower (m-l) bits of one of the first image data R_DATA is larger than a corresponding critical value, 1 may be outputted, and otherwise 0 may be outputted. For example, when one of the regions has values [127 128 129 130 127 128] on a first row, [64 65 66 32 38 46] on a second row, [85 86 87 85 85 85] on a third row, and [75 76 77 77 76 75] on a fourth row, the first group g11 of the dither matrix DM1 corresponds to [[127 128 129][64 65 66]]. Among these, 127 is expresses as 01111111 in an 8-bit binary number form, and a value expressed by lower 2 bits is 3. Since this value is larger than the critical value, i.e., 0, of the first group g11, the flag c_result is outputted as 1. All values of lower 2 bits of numbers included in a region corresponding to the first group g11 are expressed as [[3 0 1] [0 1 2]]. When the values of lower 2 bits are compared with the critical value, i.e., 0, of the first group g11 to output the flag c_result, values of the flag for the 6 image data are outputted as 1, 0, 1, 0, 1, 1.

The compensating unit 133_3 compensates a value of the medium image data t_DATA according to the flag c_result received from the comparing unit 133_2. When a value of lower (m-l) bits of the first image data or the second image data is larger than a corresponding critical value, a value of the medium image data t_DATA is increased as much as a predetermined weight value. For instance, the weight value may be 1. The compensated medium image data are outputted as the output image signals DATA''.

As described above, according to exemplary embodiments of the present invention, a dither matrix is configured on a basis of the 3-dimensional image data DATA', and a gradation is converted using the dither matrix. Therefore, image distortion and gradation banding phenomenon due to reference to the second image data during gradation conversion of the first image data may be prevented.

Figure 5:
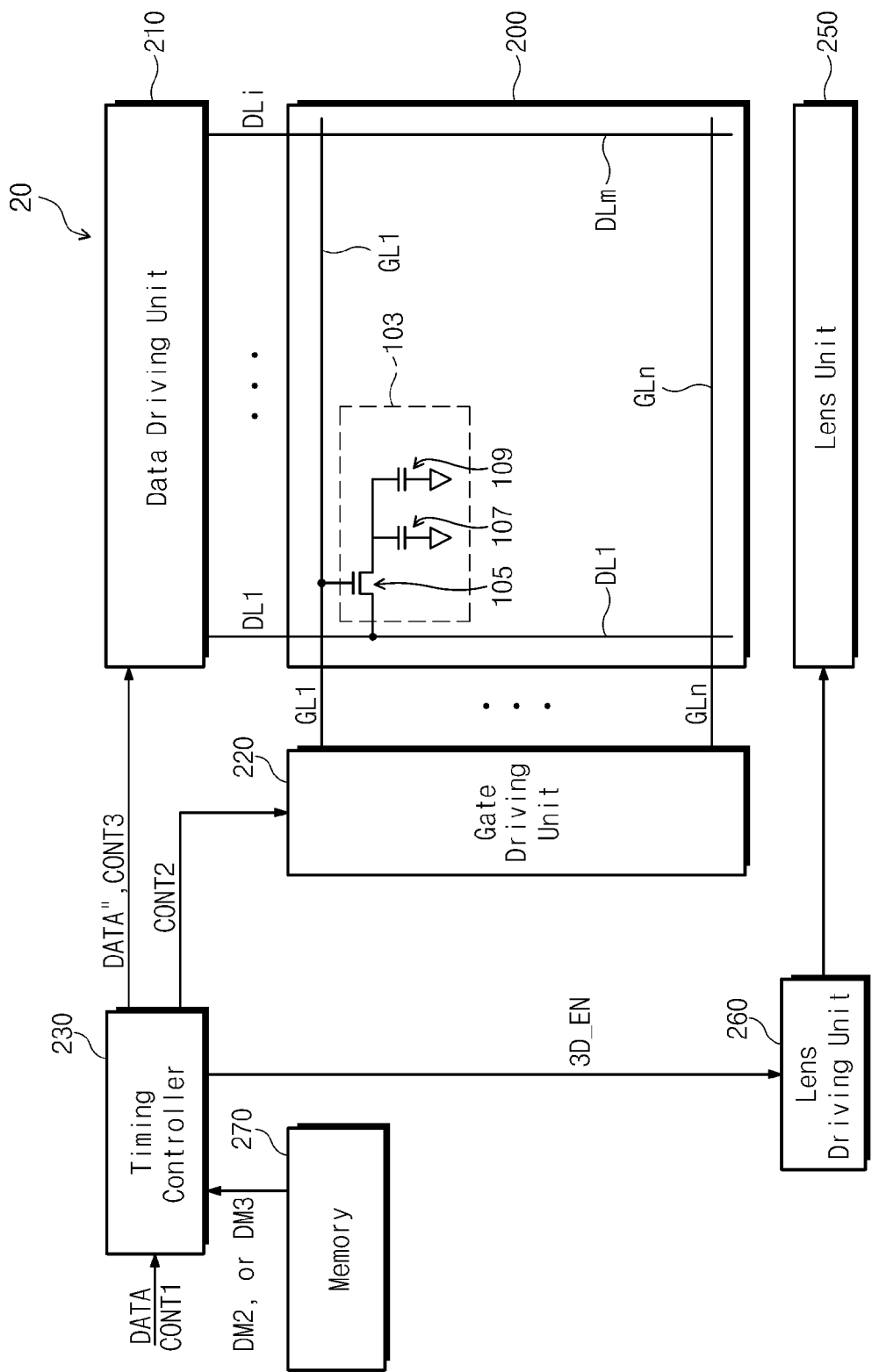
FIG. 5 is a block diagram illustrating a display device according to exemplary embodiments of the present invention.

FIG. 5 is a block diagram illustrating a display device according to exemplary embodiments of the present invention.

Referring to FIG. 5, for example, a display device 20 includes a display panel 200, a data driving unit 210, a gate driving unit 220, and a timing controller 230. Configurations of the display panel 200 and the gate driving unit 220 may be the same as the gate driving unit 120 and the display panel 100 of FIG. 1, and thus detailed descriptions thereof are omitted to avoid unnecessarily obscuring the present invention.

For example, the timing controller 230 receives m-bit image data DATA (m is a natural number) from a video system (not illustrated), and outputs an output frame according to a driving mode. The driving mode may be recorded on head parts of the image data DATA.

When the driving mode is a 3D mode, the received image data DATA are divided into n numbers of image data for each viewpoint (n is a natural number equal to or larger than 2), and the n image data for each viewpoint are rearranged to generate an output frame. When the driving mode is a 2D mode, the timing controller 230 directly outputs the image data DATA.

As an example, for the data driving unit 210 capable of expressing lbits (l is a natural number smaller than m), the timing controller 230 converts the n image data for each viewpoint or the image data DATA into an l-bit form, and outputs the converted data as the output image signals DATA".

The data driving unit 210 receives the output image signals DATA" from the timing controller 230, and converts the output image signals DATA" into data voltages in response to the data control signal CONT3. When the driving mode is a 2D mode, the data voltages include n data voltages which respectively correspond to the n image data for each viewpoint. Meanwhile, when the driving mode is a 3D mode, data voltages corresponding to the image data DATA are supplied to the data lines DL1 to DLi.

And, the data driving unit 210 is electrically connected to the data lines DL1 to DLi provided to the display panel 200 to supply the converted data voltages to the display panel 200. The display panel 200 receives the n data voltages and displays an image composed of n images for each viewpoint.

For example, the display device 20 further includes a lens unit 250 for dividing the n images for each viewpoint displayed on the display panel 200, and a lens driving unit 260 for driving the lens unit 250 in response to a control signal 3D_EN.

Although not illustrated in the drawings, the lens unit 250 may be provided on the display panel 100 to provide different images for each viewpoint to left and right eyes of a user according to a user position. The lens unit 250 may be provided with a liquid crystal lens which is operated according to whether a voltage is applied.

Figure 6:
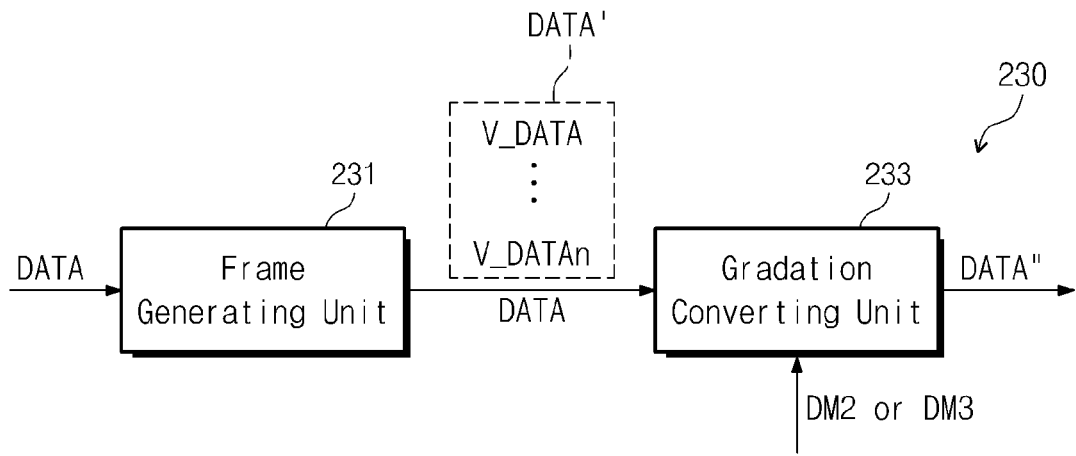
FIG. 6 is a block diagram illustrating a timing controller according to exemplary embodiments of the present invention.

FIG. 6 is a block diagram illustrating the timing controller 230 of FIG. 5.

Referring to FIG. 6, for example, a frame generating unit 231 receives an input frame including the m-bit image data DATA from the video system (not illustrated), and generates an output frame according to the driving mode. In this example, when the driving mode is a 3D mode, the frame generating unit 231 divides the received image data DATA into the n image data for each viewpoint V_DATA1 to V_DATAn, and rearranges the n image data for each viewpoint V_DATA1 to V_DATAn to generate an output frame. On the contrary, when the driving mode is a 2D mode, the frame generating unit 231 outputs the input frame as the output frame.

When the number of bits processible by the data driving unit 210 (hereinafter, l bits) is smaller than the number of bits representing the n image data for each viewpoint (hereinafter, m bits), a gradation converting unit 233 converts the m-bit image data for each viewpoint V_DATA1 to V_DATAn into l-bit image data for each viewpoint. The converted image data for each viewpoint V_DATA1 to V_DATAn or the image data DATA are outputted as the output image signals DATA". The gradation converting unit 233 according to exemplary embodiments performs a dithering operation to the output frame in the same manner as in the first embodiment.

When the driving mode is a 2D mode, the gradation converting unit 233 performs a dithering operation to the output frame using a dither matrix DM3 configured on a basis of a 2-dimensional image data including three image data DATA which correspond to the first to third pixels. For example, the three image data may be a red image data, a green image data, and a blue image data, and may express one color data by combining the three image data.

For example, when the driving mode is a 3D mode, the gradation converting unit 233 performs a dithering operation to the n image data for each viewpoint V_DATA1 to V_DATAn individually. In this example, the dither matrix DM3 is configured on a basis of a 3-dimensional image data DATA' defined by a pair of the image data for each viewpoint V_DATA1 to V_DATAn.

Figure 7A:
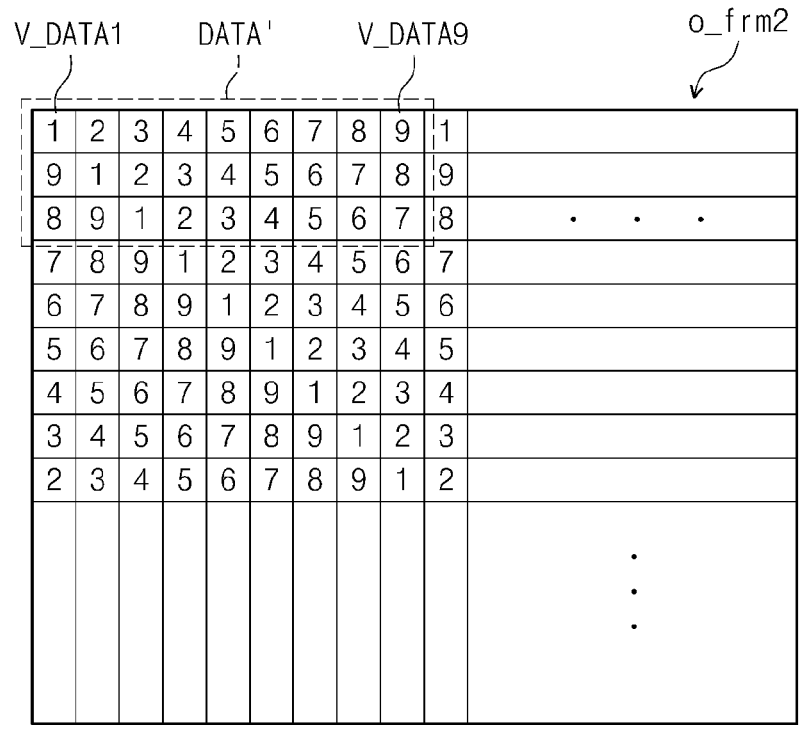
FIG. 7A is a reference diagram illustrating an output frame according to exemplary embodiments of the present invention.
Figure 7B:
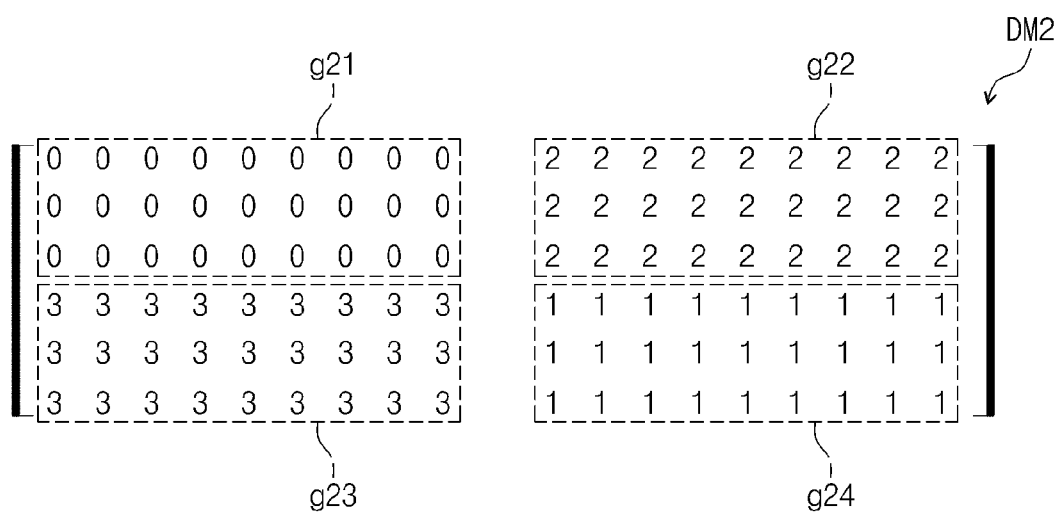
FIG. 7B is a diagram illustrating an exemplary dither matrix applied to an output frame of FIG. 7A.

FIG. 7A is a reference diagram illustrating an output frame according to exemplary embodiments of the inventive concept, and FIG. 7B is a diagram illustrating an exemplary dither matrix.

Referring to FIG. 7A, an output frame o_frm2 includes 9 image data for each viewpoint V_DATA1 to V_DATA9. Numbers in the output frame o_frm2 denote viewpoint numbers of the image data for each viewpoint V_DATA 1 to V_DATA9.

For example, the image data for each viewpoint V_DATA1 to V_DATA9 in the output frame o_frm2 are arranged as follows. Firstly, on a first row, a first viewpoint image data V_DATA1 is arranged on a first column, and second to ninth viewpoint data V_DATA2 to V_DATA9 are sequentially arranged from on a second column. And, after the ninth viewpoint image data V_DATA9, the first viewpoint image data V_DATA1 is arranged again.

Next, on a second row, the ninth viewpoint image data V_DATA9 is arranged on a first column, and the first to ninth viewpoint image data V_DATA1 to V_DATA9 are sequentially arranged from on a second column. And, after the ninth viewpoint image data V_DATA9, the first viewpoint image dataV_DATA1 is arranged again. In other words, nth viewpoint image data arranged on a yth column of an xth row is arranged on a (y+1)th column of an (x+1)th row (where, x and y are natural numbers equal to or greater than 1). As illustrated in FIG. 7A, each 3-dimensional image data DATA' may include three of each of the image data for each viewpoint V_DATA1 to V_DATA9.

The image data for each viewpoint V_DATA1 to V_DATA9 may include a red image data, a green image data, and a blue image data. For example, the first viewpoint image data V_DATA1 may include a first viewpoint red image data, a first viewpoint green image data, and a first viewpoint blue image data.

FIG. 7B illustrates a dither matrix DM2 which is applied to the output frame o_frm2 of FIG. 7A, and corresponds to four 3-dimensional image data DATA' arranged in a 2×2 matrix form.

Referring to FIG. 7B, for example, the dither matrix DM2 is constituted of a combination of four critical values, i.e., 0, 1, 2, and 3, to be compared with lower 2 bits of the 9 image data for each viewpoint V_DATA1 to V_DATA9.

The dither matrix DM2 may be divided into four groups g21 to g24 corresponding to the 3-dimensional image DATA'. For comparing the image data for each viewpoint V_DATA1 to V_DATA9 composing the same 3-dimensional image data DATA' with the same critical value, elements in the same group g2 have the same critical value. The dither matrices DM2 and DM3 may be preconfigured and stored in a memory 270.

Since a configuration of the gradation converting unit 233 is the same as in the embodiment, detailed descriptions of the gradation converting unit 233 are omitted to avoid unnecessarily obscuring the present invention.

For example, when the driving mode is a 3D mode, a dither matrix is configured on a basis of a 3-dimensional image data, and a gradation is converted using the dither matrix. Therefore, image distortion and gradation banding phenomenon due to reference to the second image data during gradation conversion of the first image data may be prevented.

Figure 8:
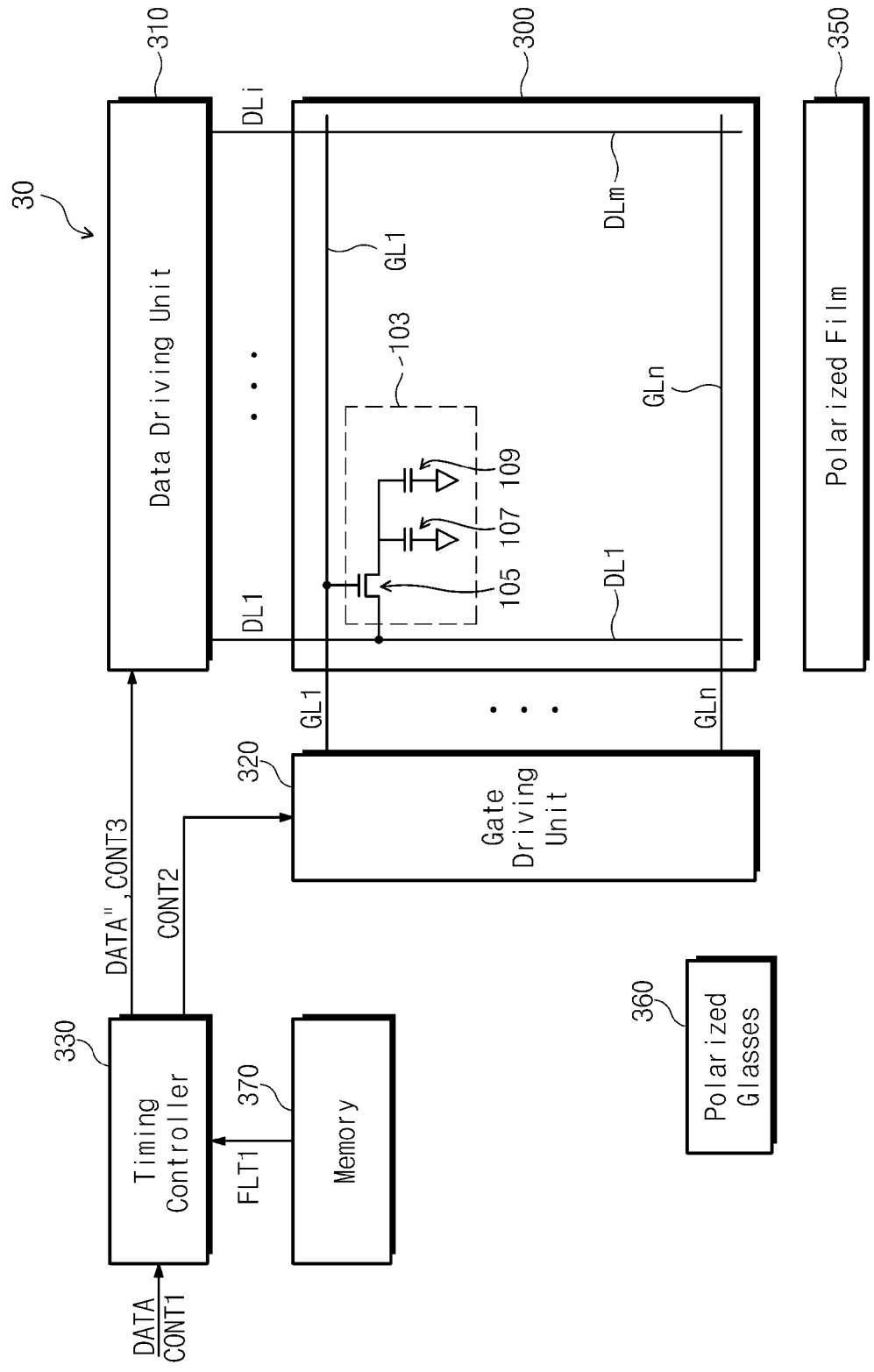
FIG. 8 is a block diagram illustrating a display device according to exemplary embodiments of the present invention.

FIG. 8 is a block diagram illustrating a display device according to exemplary embodiments of the present invention.

Referring to FIG. 8, for example, a display device 30 includes a timing controller 330, a data driving unit 310, a gate driving unit 320, a display panel 300, a memory 370, a polarized film 350, and polarized glasses 360. Since the data driving unit 310, the gate driving unit 320, the display panel 300, the polarized film 350, and the polarized glasses 360 are the same as those of the first embodiment, detailed descriptions thereof are omitted to avoid unnecessarily obscuring the present invention.

The timing controller 330 receives an input frame including a plurality of image signals DATA from a video system (not illustrated), divides the image signals DATA into first image signals for right eye and second image signals for left eye, and generates an output frame in which the first and second image signals are arranged according to positions of corresponding pixels. And, the timing controller 330 applies a first filter FLT1 to an image displayed by the output frame, and outputs first image signal and second image signal included in the output frame to which the first filter FLT1 is applied as output image signals DATA".

Figure 9:
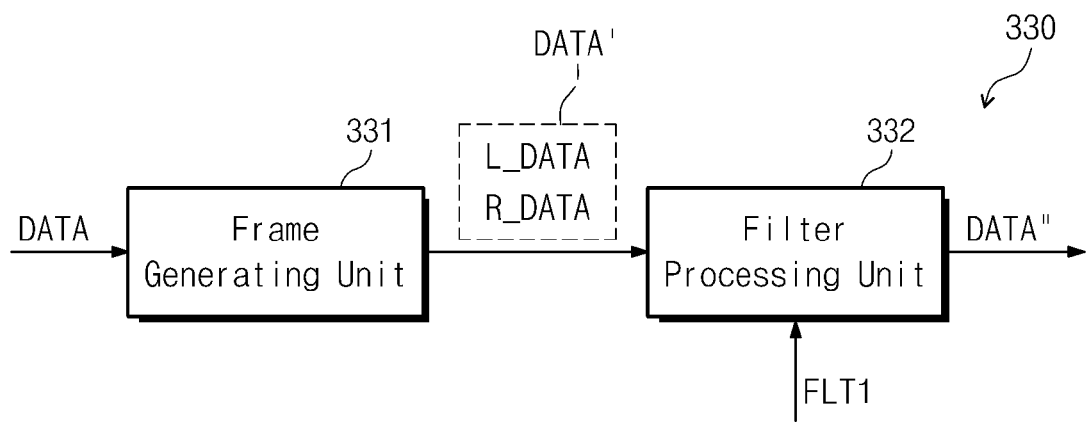
FIG. 9 is a block diagram illustrating a timing controller of FIG. 8.

FIG. 9 is a block diagram illustrating the timing controller 330 of FIG. 8.

Referring to FIG. 9, for example, the timing controller 330 includes a frame generating unit 330 and a filter processing unit 332. Since the frame generating unit 331 performs the same function as the frame generating unit 131 of FIG. 2, detailed descriptions thereof are omitted to avoid unnecessarily obscuring the present invention.

The filter processing unit 332 receives the output frame from the frame generating unit 330 to filter the first image data R_DATA and the second image data L_DATA, and outputs the filtered first image data R_DATA and second image data L_DATA as output image signals DATA". The first filter FLT1 used for the filtering operation may be a Gaussian filter which blurs an image or a filter which enhances outlines for sharpening an image.

However, as illustrated in FIG. 3A, for example, the first image data R_DATA are arranged on odd numbered pixel rows, and the second image data L_DATA are arranged on even numbered pixel rows in the output frame o_frm1. Therefore, when the output frame o_frm1 is filtered, the first image data R_DATA and the second image data L_DATA are independently filtered. In this example, the first filter FLT1 is configured on a basis of 3-dimensional image data DATA' which include the first image data R_DATA and the second image data L_DATA.

Hereinafter, a form of the filter and an image processing operation using the filter are described in detail referring to FIG. 3A and FIG. 10.

Figure 10:
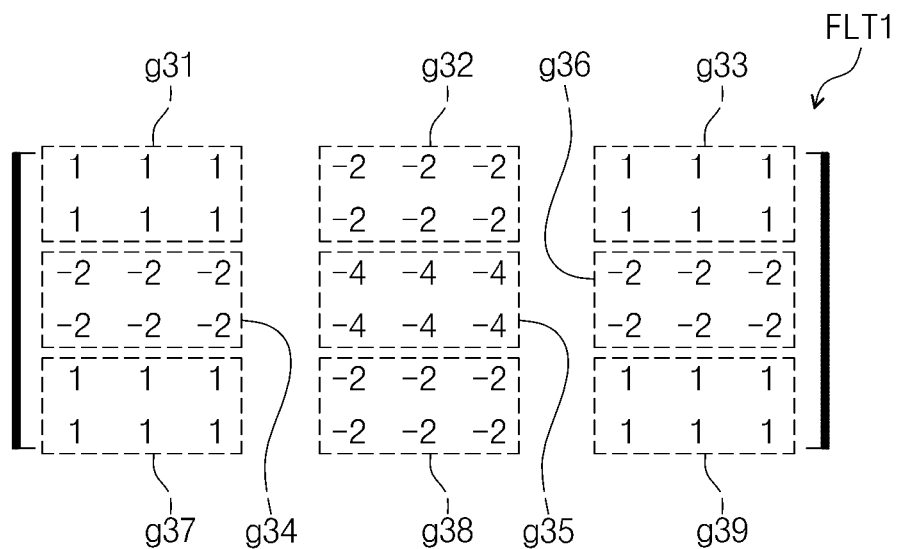
FIG. 10 is a diagram illustrating an exemplary filter according to exemplary embodiments of the present invention.

FIG. 10 is a diagram illustrating an exemplary filter according to exemplary embodiments of the inventive concept. For example, the first filter FLT1 is applied to the output frame o_frm1 of FIG. 3A, and corresponds to nine 3-dimensional image data DATA' arranged in a 3×3 matrix form. The first filter FLT1 corresponds to the 3-dimensional image data DATA' (illustrated in FIG. 3) disposed at a filtering position, and adjacent eight 3-dimensional image data DATA' surrounding the foregoing 3-dimensional image data DATA'.

Referring to FIG. 10, for example, the first filter FLT1 may be divided into 9 groups g31 to g39 corresponding to each 3-dimensional image data DATA'. Also, for adding the same weight value to the first image data and the second image data composing the same 3-dimensional image data DATA', elements included in the same group have the same value. A size of the first filter FLT1, and values of elements included in the first filter FLT1 may be preconfigured and stored in the memory 370.

Figure 11A:
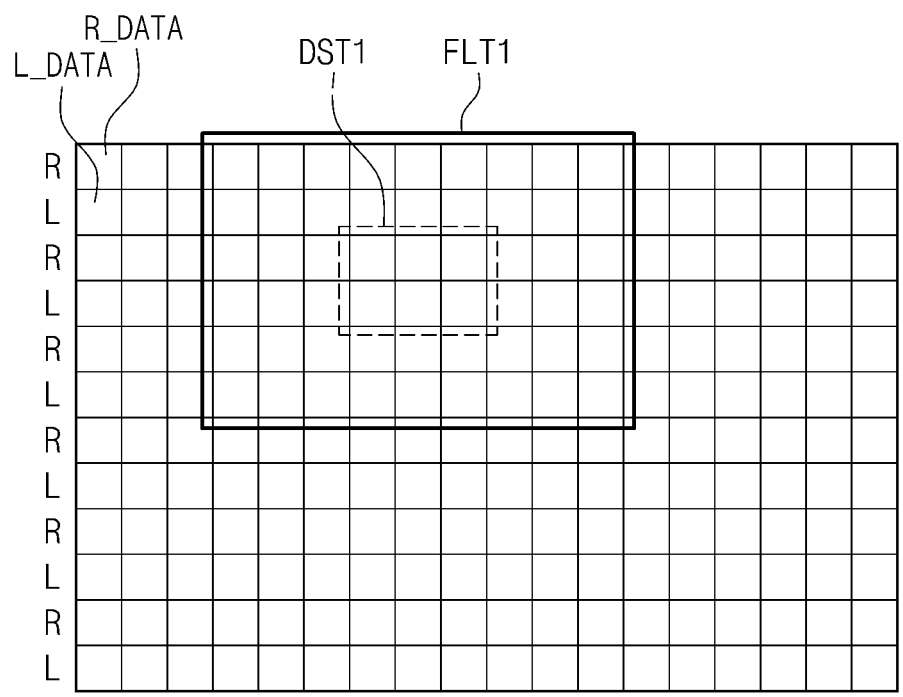
FIG. 11A, FIG. 11B and FIG. 11C are diagrams illustrating a filtering process according to exemplary embodiments of the present invention.
Figure 11B:
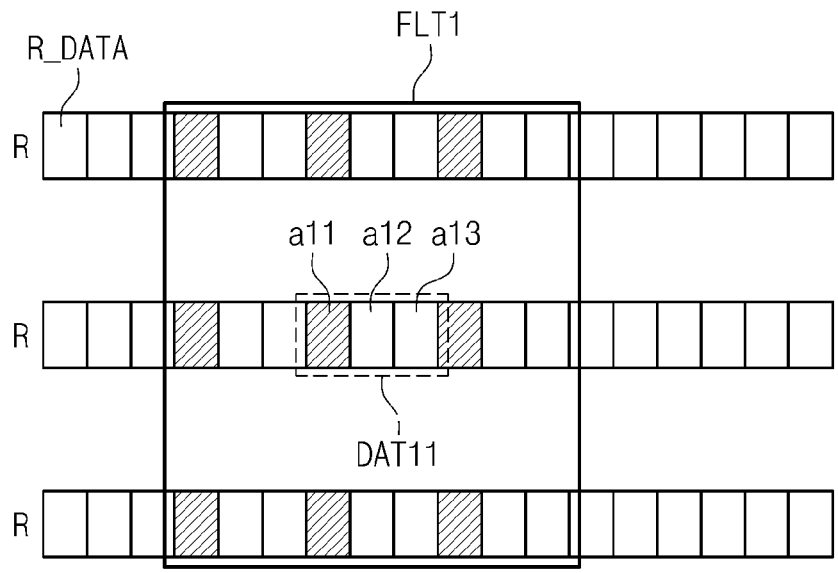
Figure 11C:
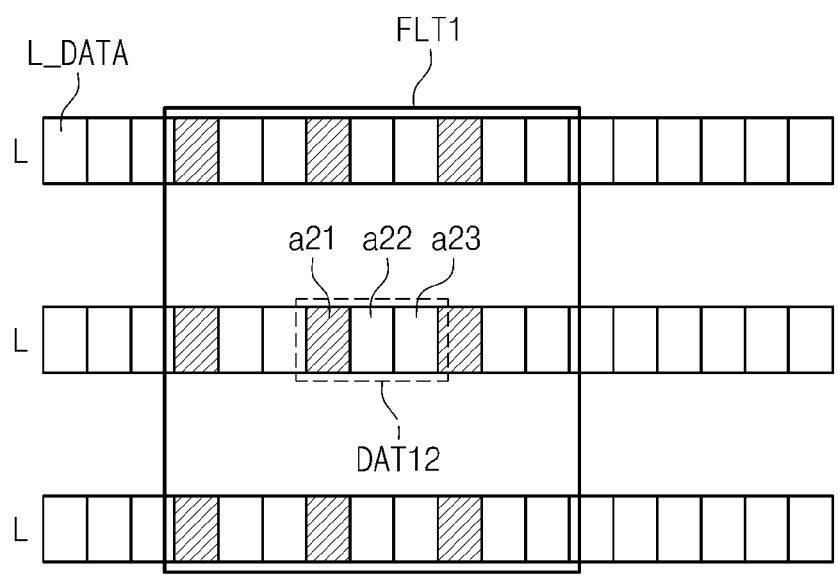

FIG. 11A, FIG. B and FIG. 11C are diagrams illustrating the filtering process according to exemplary embodiments of the present invention. For example, FIG. 11A illustrates a portion of the output frame o_frm1, FIG. 11B illustrates first image data R_DATA for right eye of FIG. 11A, and FIG. 11C illustrates second image data L_DATA for left eye of FIG. 11A.

Referring to FIG. 11A, for example, as described above referring to FIG. 3A, the 3-dimensional image data DATA' includes three first image data R_DATA and three second image data L_DATA. The three first image data R_DATA may include a first red image data, a first green image data, and a first blue image data Likewise, the three second image data L_DATA may include a second red image data, a second green image data, and a second blue image data.

The filter processing unit 312 matches the first filter FLT1 to each 3-dimensional image data DATA' included in the output frame o_frm1 received from the frame generating unit 311 to perform a filtering operation. In this example, the filter processing unit 312 matches a 3-dimensional image data DST1 to be filtered to a fifth group g35 which is a reference group of the first filter FLT1. Then, each element of the first filter FLT1 is multiplied by each of the first and second image data R_DATA and L_DATA corresponding to each element of the first filter FLT1, and values of first and second image data DST11 and DST12 composing the 3-dimensional image data DST1 to be filtered are substituted with a value obtained by adding the multiplied values.

Referring to FIG. 11B, each value of the first image data DST11 to be filtered is calculated using the first image data R_DATA corresponding to the first filter FLT1 and elements of the first filter FLT1. For example, the three first image data DST11 composing the 3-dimensional image data DST1 to be filter are individually filtered.

For example, among the three first image data DST11 to be filtered, a value of the first red image data a11 is filtered using the first red image data a11, first red image data (hatched portion) included in neighboring 3-dimensional image data, and elements of a corresponding filter. The first green image data a12 and the first blue image data a13 are also filtered in the same manner.

Meanwhile, referring to FIG. 11C, each value of the second image data DST12 to be filtered is calculated using the second image data L_DATA matched to the first filter FLT1 and elements of the first filter FLT1. As described above referring to FIG. 11b, the three image data DST12 composing the 3-dimensional image data DST1 to be filtered are individually filtered. In this example, among the three second image data DST12 to be filtered, a value of the second red image data a21 is filtered using the second red image data a21, second red image data (hatched portion) included in neighboring 3-dimensional image data, and elements of a corresponding filter. The second green image data a22 and the blue image data a23 are also filtered in the same manner.

As described above, according to the exemplary embodiments of the inventive concept, a filter is configured on a basis of 3-dimensional image data DATA', and the output frame is filtered using the filter. Thus, the second image data are prevented from being referred to when the first image data are filtered. Accordingly, image distortion may be prevented. Also, since the output frame is filtered after being formed, data processing amount may be reduced, and thus cost may be reduced.

Figure 12:
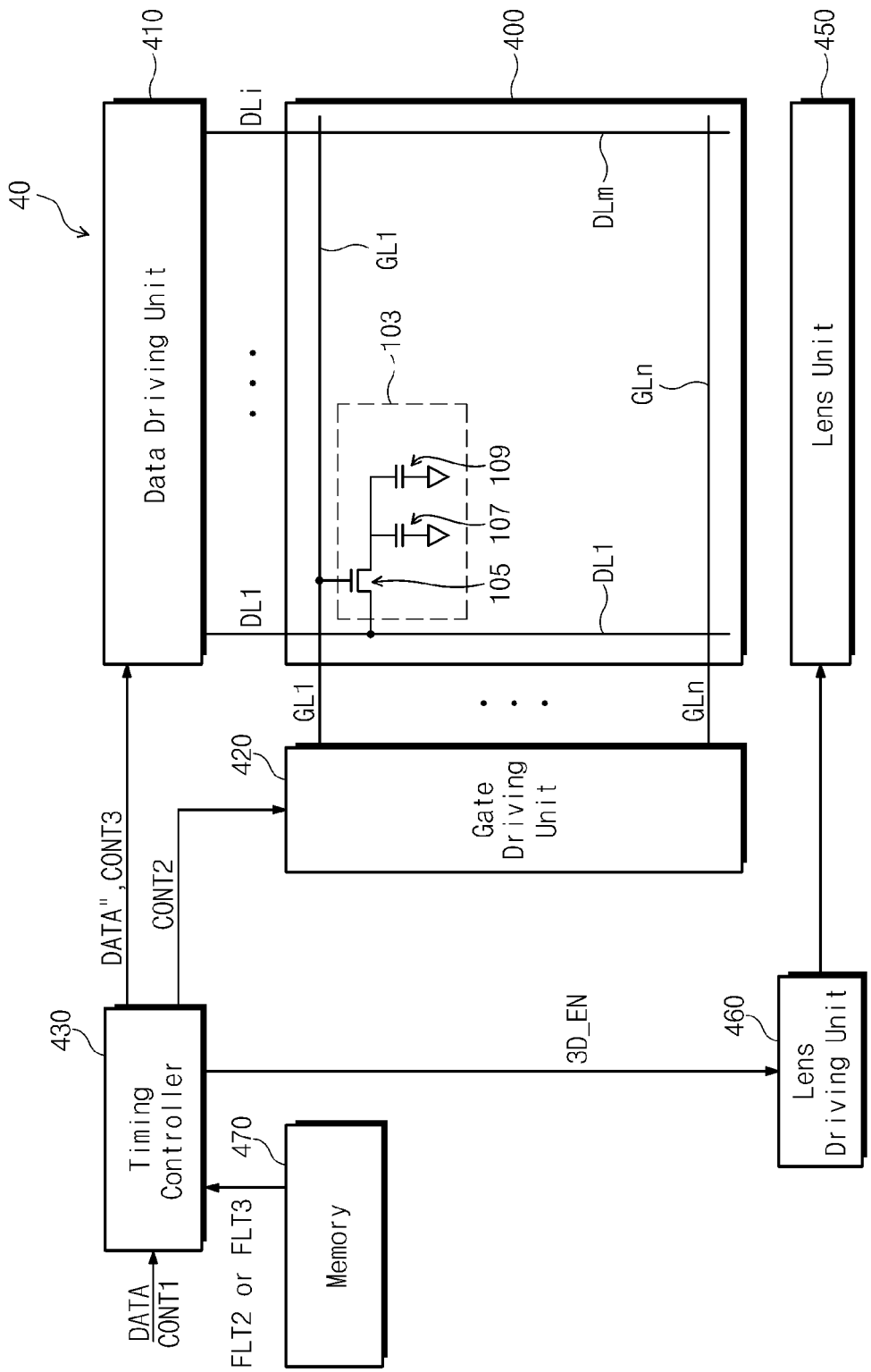
FIG. 12 is a block diagram illustrating a display device according to exemplary embodiments of the present invention.

FIG. 12 is a block diagram illustrating a display device according to exemplary embodiments of the inventive concept.

Referring to FIG. 12, for example, a display device 40 includes a timing controller 430, a data driving unit 410, a gate driving unit 420, a display panel 400, a lens unit 450, and a lens driving unit 460. Since configurations of the gate driving unit 420, the display panel 400, the lens unit 450, and the lens driving unit 460 are the same as those of the second embodiment, detailed descriptions thereof are omitted to avoid unnecessarily obscuring the present invention.

The timing controller 430 receives an input frame including a plurality of image data DATA from a video system (not illustrated), divides the received image data DATA into n numbers of image data for each viewpoint (n is a natural number equal to or larger than 2), and outputs an output frame in which the n image data for each viewpoint are rearranged when the driving mode is a 3D mode. When the driving mode is a 2D mode, the timing controller 230 directly outputs the image data DATA.

The timing controller 430 applies a second filter FLT2 or a third filter FLT3 to the output frame according to the driving mode, and outputs image data DATA or image data for each viewpoint included in a filtered output frame as output image signals DATA".

Figure 13:
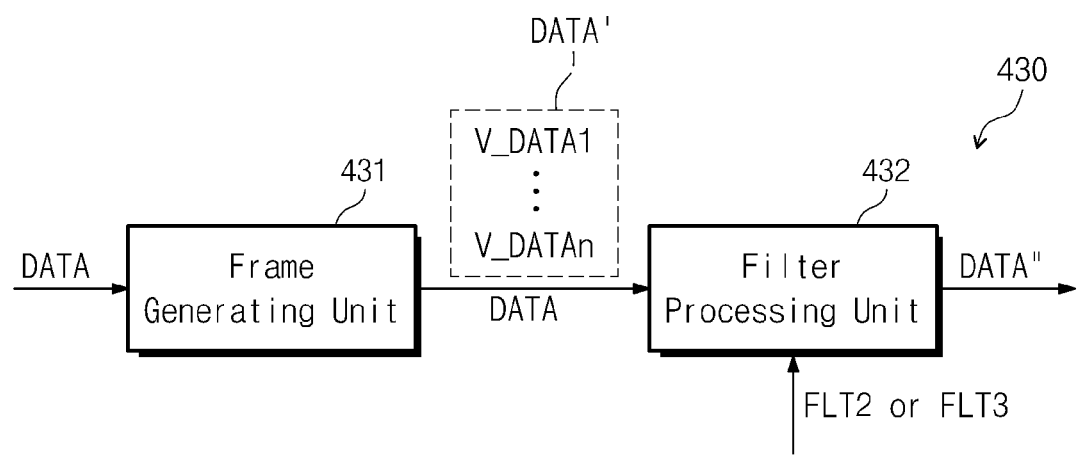
FIG. 13 is a block diagram illustrating a timing controller of FIG. 12.

FIG. 13 is a block diagram illustrating the timing controller 430 of FIG. 12.

Referring to FIG. 13, for example, the timing controller 430 includes a frame generating unit 431 and a filter processing unit 432. Since the frame generating unit 431 performs the same function as the frame generating unit 231 of FIG. 6, detailed descriptions thereof are omitted to avoid unnecessarily obscuring the present invention.

For example, the filter processing unit 432 receives the output frame from the frame generating unit 431, and selects one of the second filter FLT2 and the third filter FLT3 according to the driving mode to filter the output frame. When the driving mode is a 3D mode, the filtering operation is performed using the second filter FLT2, and the filtered image data for each viewpoint V_DATA1 to V_DATAn are outputted as the output image signals DATA". When the driving mode is a 2D mode, the output frame is filtered using the third filter FLT3, and the filtered image data DATA are outputted as the output image signals DATA". The second filter FLT2 and the third filter FLT3 may be stored in a memory 470.

When the driving mode is a 3D mode, since the output frame includes n image data for each viewpoint V_DATA1 to V_DATAn, the n image data for each viewpoint V_DATA1 to V_DATAn are individually filtered. In this example, the second filter FLT2 may be configured on a basis of 3-dimensional image data DATA' including the 9 image data for each viewpoint V_DATA1 to V_DATA9 like the dither matrix DM2 of FIG. 7B.

FIG. 14 is a diagram illustrating an exemplary filter according to exemplary embodiments of the present invention.

FIG. 14 illustrates one example of the exemplary embodiments of above-described filter. For example, the second filter FLT2 is applied to the output frame o_frm2 illustrated in FIG. 7A, and corresponds to nine 3-dimensional image data DATA' arranged in a 3×3 matrix form. The second filter FLT2 corresponds to the 3-dimensional image data DST2 disposed at a filtering position, and adjacent eight 3-dimensional image data surrounding the 3-dimensional image data DST2.

Referring to FIG. 14, the second filter FLT2 may be divided into 9 groups g41 to g49 corresponding to each 3-dimensional image data DATA'. Also, for adding the same weight value to the 9 image data for each viewpoint V_DATA1 to V_DATA9 composing the same 3-dimensional image data DATA', elements included in the same group have the same value.

Figure 15A:
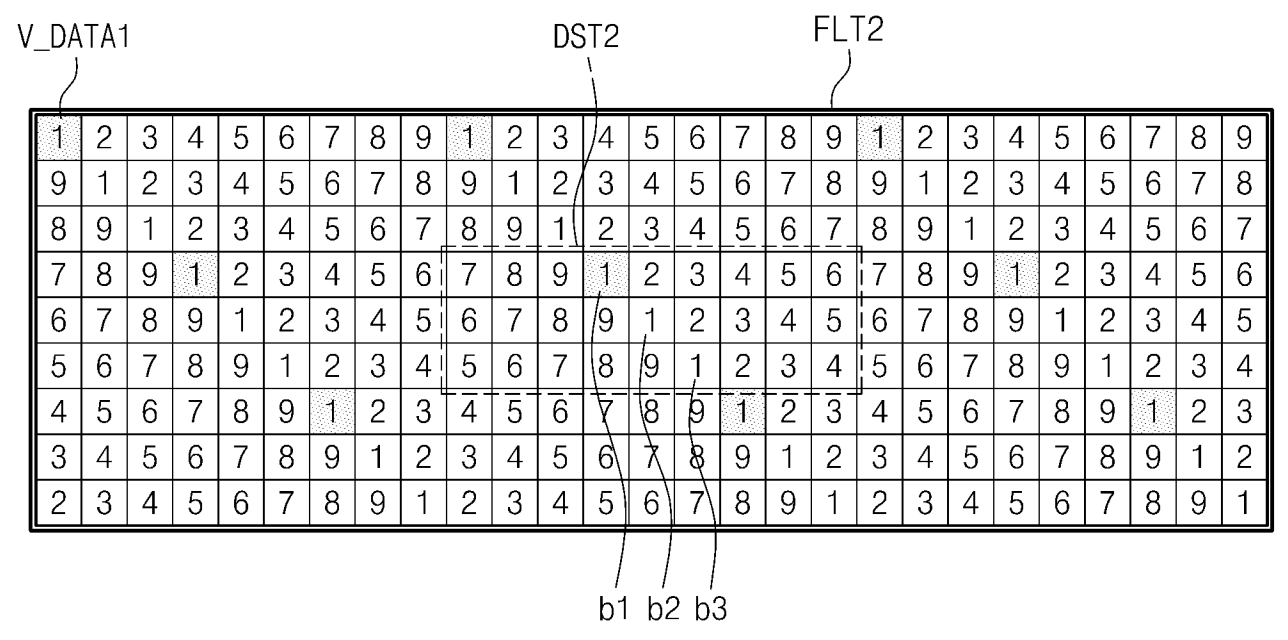
Figure 15B:
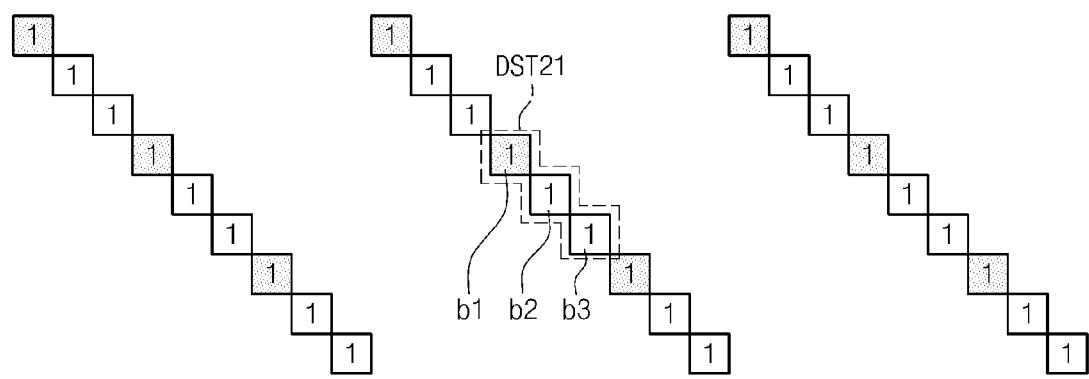

FIG. 15A and FIG. 15B are diagrams illustrating a filtering process according to exemplary embodiments of the inventive concept. For example, FIG. 15A illustrates a portion of the output frame o_frm2, and FIG. 15B illustrates image data of first viewpoint of FIG. 15A.

As described above referring to FIG. 7A, the output frame may include first to ninth viewpoint image data V_DATA1 to V_DATA9, and the first to ninth viewpoint image data V_DATA1 to V_DATA9 may include red image data, green image data, and blue image data. For example, the first viewpoint image data may include first viewpoint red image data, first viewpoint green image data, and first viewpoint blue image data.

Referring to FIG. 15A, for example, the filter processing unit 432 matches the image data for each viewpoint DST2 to be filtered in the received output frame o_frm2 to a fifth group g45 of the second filter FLT2. Then, each element of the second filter FLT2 is multiplied by each of the first to ninth viewpoint image data V_DATA1 to V_DATA9 corresponding to each element of the second filter FLT2, and values of the first to ninth viewpoint image data V_DATA1 to V_DATA9 are substituted with a value obtained by adding the multiplied values.

Referring to FIG. 15B, for example, each value of the first viewpoint image data DST21 to be filtered is calculated using the first viewpoint image data V_DATA1 corresponding to the first filter FLT1 and elements of the second filter FLT2. Herein, the three first image data DST21 composing the 3-dimensional image data DST2 to be filtered are individually filtered.

In this example, among the three first image data DST21 to be filtered, a value of the first red image data b1 is filtered using the first viewpoint red image data b1, first red image data (hatched portion) included in neighboring 3-dimensional image data, and elements of a corresponding filter. The first viewpoint green image data b2 and the first viewpoint blue image data b3 are also filtered in the same manner. Other image data for each viewpoint are filtered in the same manner as the first viewpoint image data V_DATA1, and thus detailed descriptions thereof are omitted to avoid unnecessarily obscuring the present invention.

As described above, according to exemplary embodiments of the inventive concept, it is contemplated that the second filter FLT2 is configured on a basis of 3-dimensional image data, and the output frame is filtered using the second filter FLT2 when the driving mode is a 3D mode. Thus, image distortion may be prevented by referring to image data of another viewpoint when an image data of one viewpoint is filtered. Also, since the output frame is filtered after being formed, data processing amount may be reduced.

As described above, according to the exemplary data processing methods, data may be processed on a basis of the 3-dimensional image pixel. Thus, image distortion and gradation change may be prevented, when referring to another viewpoint data associated with a viewpoint data are processed.

Also, according to the exemplary data processing methods, the filtering operation is performed after generating the output frame in which the image data for each viewpoint are arranged. Therefore, data processing amount is reduced, and consequently cost for processing data may be reduced.

One of ordinary skill in the art would recognize that the processes for processing data associated with a 3-D display device capable of providing an enhanced display quality may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 16.

Figure 16:
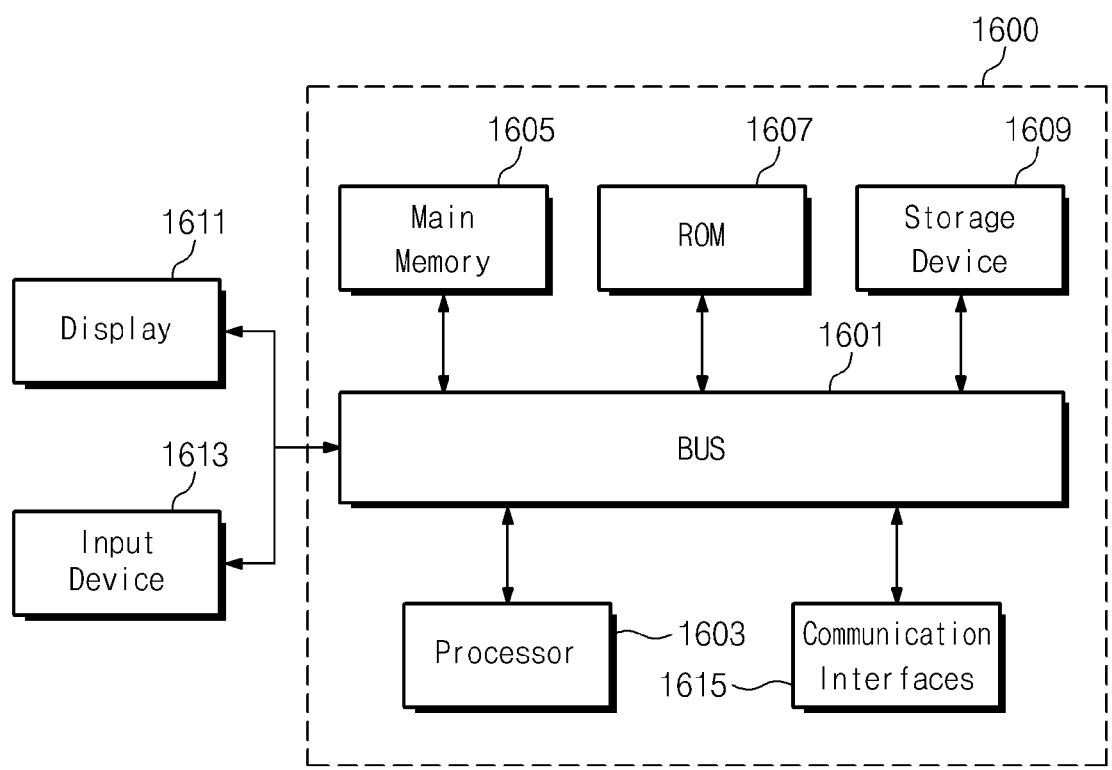
FIG. 16 is a diagram of hardware that can be used to implement a data processing of a display device capable of providing an enhanced display quality associated with 3-D display according to exemplary embodiments of the present invention.

FIG. 16 illustrates exemplary hardware upon which various embodiments of the invention can be implemented. A computing system 1600 includes a bus 1601 or other communication mechanism for communicating information and a processor 1603 coupled to the bus 1601 for processing information. The computing system 1600 also includes main memory 1605, such as a random access memory (RAM) or other dynamic storage device, coupled to the bus 1601 for storing information and instructions to be executed by the processor 1603. Main memory 1605 can also be used for storing temporary variables or other intermediate information during execution of instructions by the processor 1603. The computing system 1600 may further include a read only memory (ROM) 1607 or other static storage device coupled to the bus 1601 for storing static information and instructions for the processor 1603. A storage device 1609, such as a magnetic disk or optical disk, is coupled to the bus 1601 for persistently storing information and instructions.

The computing system 1600 may be coupled via the bus 1601 to a display 1611, such as a liquid crystal display, or active matrix display, for displaying information to a user. An input device 1613, such as a keyboard including alphanumeric and other keys, may be coupled to the bus 1601 for communicating information and command selections to the processor 1603. The input device 1613 can include a cursor control, such as a mouse, a trackball, or cursor direction keys, for communicating direction information and command selections to the processor 1603 and for controlling cursor movement on the display 1611.

According to various embodiments of the invention, the processes described herein can be provided by the computing system 1600 in response to the processor 1603 executing an arrangement of instructions contained in main memory 1605. Such instructions can be read into main memory 1605 from another computer-readable medium, such as the storage device 1609. Execution of the arrangement of instructions contained in main memory 1605 causes the processor 1603 to perform the process steps described herein. One or more processors in a multi-processing arrangement may also be employed to execute the instructions contained in main memory 1605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1600 also includes at least one communication interface 1615 coupled to bus 1601. The communication interface 1615 provides a two-way data communication coupling to a network link (not shown). The communication interface 1615 sends and receives electrical, electromagnetic, or optical signals that carry digital data streams representing various types of information. Further, the communication interface 1615 can include peripheral interface devices, such as a Universal Serial Bus (USB) interface, a PCMCIA (Personal Computer Memory Card International Association) interface, etc.

The processor 1603 may execute the transmitted code while being received and/or store the code in the storage device 1609, or other non-volatile storage for later execution. In this manner, the computing system 1600 may obtain application code in the form of a carrier wave.

The term "computer-readable medium" as used herein refers to any medium that participates in providing instructions to the processor 1603 for execution. Such a medium may take many forms, including but not limited to non-volatile media, volatile media, and transmission media. Non-volatile media include, for example, optical or magnetic disks, such as the storage device 1609. Volatile media include dynamic memory, such as main memory 1605. Transmission media include coaxial cables, copper wire and fiber optics, including the wires that comprise the bus 1601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a frame generating unit configured to receive an input frame comprising m-bit image data, wherein m is a natural number, to divide the image data into n different image data for each viewpoint, wherein n is a natural number greater than or equal to 2, and to generate an output frame comprising a plurality of 3-dimensional image data comprising the n different image data for each viewpoint;
a gradation converting unit configured to perform a dithering operation to the output frame using a dither matrix comprising a plurality of (m-l)-bit critical values which are divided into k groups, wherein k is a natural number greater than or equal to 4, and the division is performed by one-to-one correspondence with k numbers of the 3-dimensional image data so that each of the image data for each viewpoint expresses m-bit gradation with l bits, wherein l is a natural number smaller than m, and to output the dithered image data for each viewpoint as output image signals;

a data driving unit configured to generate a data driving voltage signal based on the output image signals received from the gradation converting unit; and a display panel configured to display an image in response to receiving the data driving voltage signal from the data driving unit.

2. The display device of claim 1, wherein the gradation converting unit comprises a medium data generating unit configured to select upper l bits among m bits of each of the image data for each viewpoint included in the output frame, and to convert the selected bits into a medium image data, a comparing unit configured to divide the output frame into a plurality of regions, to compare a value expressed by lower (m-l) bits of each of image data for each viewpoint included in each region with a critical value corresponding thereto, and to output a result of the comparison as a flag; and a compensating unit configured to compensate the medium image data in response to the flag, and to output the compensated medium image data as the output image signals.

3. The display device of claim 1, wherein the dither matrix comprises a ixj matrix, wherein the i and j are both natural numbers greater than or equal to 2.

4. The display device of claim 1, wherein the critical values included in each group are the same.

5. The display device of claim 1, wherein the 3-dimensional image data comprise first image data for a right eye and second image data for a left eye.

6. The display device of claim 1, wherein the display device comprises a driving mode comprising a 3D mode configured to display a 3-dimensional image and a 2D mode configured to display a 2-dimensional image, and the frame generating unit is configured to divide the image data into the n image data for each viewpoint in the 3D mode.

7. The display device of claim 6, wherein in the 2D mode, the frame generating unit is configured to directly output the image data, and the gradation converting unit is configured to perform a dithering operation to the output frame using a dither matrix comprising a plurality of critical values which one-to-one correspond to image data so that the image data are expressed with l bits, and to output the dithered image data for each viewpoint as the output image signals.

8. A method for processing data provided to a display panel which comprises a plurality of pixels for displaying an image and a processor, the method comprising:

receiving an input frame comprising m-bit image data, wherein m is a natural number from the outside, dividing, using the processor, the image data into n different image data for each viewpoint, wherein n is a natural number greater than or equal to 2, and generating an output frame comprising a plurality of 3-dimensional image data comprising the n different image data for each viewpoint; and dithering the output frame using a dither matrix comprising a plurality of (m-l)-bit critical values which are divided into k groups, wherein k is a natural number greater than or equal to 4, and the division is performed by one-to-one correspondence with k numbers of the 3-dimensional image data so that each of the image data for each viewpoint expresses m-bit gradation with l bits, wherein l is a natural number smaller than m, and outputting the dithered image data for each viewpoint as output image signals.

9. The method of claim 8, wherein the dithering of the output frame comprises selecting upper l bits among m bits of each of the image data for each viewpoint included in the output frame, and converting the selected bits into a medium image data, dividing the output frame into a plurality of regions, comparing a value expressed by lower (m-l) bits of each of image data for each viewpoint included in each region with a critical value corresponding thereto, and outputting a result of the comparison, and compensating the medium image data according to the result, and outputting the compensated medium image data as the output image signals.

10. The method of claim 8, further comprising:

determining whether a driving mode is a 3D mode for displaying a 3-dimensional image or a 2D mode for displaying a 2-dimensional image, wherein when the driving mode is the 3D mode, the image data are divided into the n image data for each viewpoint.

11. The method of claim 10, wherein when the driving mode is the 2D mode, the image data are directly outputted, and dithering the output frame using a dither matrix comprising a plurality of critical values which are one-to-one correspondence with the image data so that the image data have l-bit gradation, and outputting the dithered image data for each viewpoint as the output image signals.

* * * * *